US008732056B1

(12) United States Patent
Koth et al.

(10) Patent No.: US 8,732,056 B1
(45) Date of Patent: May 20, 2014

(54) METHODS AND SYSTEMS FOR PROVIDING GUARANTEED LIFETIME BENEFITS

(75) Inventors: Robert Koth, South Elgin, IL (US); Michael Zolna, West Chicago, IL (US); William Marshall, Wilmette, IL (US)

(73) Assignee: Allstate Insurance Company, Northbrook, IL (US)

( * ) Notice: Subject to any disclaimer, the term of this patent is extended or adjusted under 35 U.S.C. 154(b) by 949 days.

(21) Appl. No.: 12/417,915

(22) Filed: Apr. 3, 2009

Related U.S. Application Data

(60) Provisional application No. 61/064,987, filed on Apr. 7, 2008.

(51) Int. Cl.
*G06Q 40/00* (2012.01)
(52) U.S. Cl.
USPC .............................................. 705/36; 705/35
(58) Field of Classification Search
USPC ....................................................... 705/35, 36
See application file for complete search history.

(56) References Cited

U.S. PATENT DOCUMENTS

| | | | | |
|---|---|---|---|---|
| 5,933,815 | A * | 8/1999 | Golden | 705/36 R |
| 6,611,815 | B1 | 8/2003 | Lewis et al. | |
| 7,089,201 | B1 | 8/2006 | Dellinger et al. | |
| 7,376,608 | B1 | 5/2008 | Dellinger et al. | |
| 2002/0188540 | A1 * | 12/2002 | Fay et al. | 705/36 |
| 2002/0194098 | A1 | 12/2002 | Stiff et al. | |
| 2005/0060251 | A1 | 3/2005 | Schwartz et al. | |
| 2005/0144124 | A1 | 6/2005 | Stiff et al. | |
| 2006/0106698 | A1 | 5/2006 | Mahaney et al. | |
| 2006/0149651 | A1 | 7/2006 | Robinson | |
| 2007/0011086 | A1 | 1/2007 | Dellinger et al. | |
| 2007/0033124 | A1 | 2/2007 | Herr et al. | |
| 2007/0100715 | A1 | 5/2007 | O'Donnell et al. | |
| 2007/0100727 | A1 | 5/2007 | Multer et al. | |
| 2007/0106589 | A1 | 5/2007 | Schirripa | |
| 2007/0130035 | A1 | 6/2007 | Carden | |
| 2007/0143199 | A1 | 6/2007 | Stiff et al. | |
| 2007/0168235 | A1 | 7/2007 | Livingston et al. | |
| 2007/0255635 | A1 | 11/2007 | Multer et al. | |
| 2008/0010095 | A1 | 1/2008 | Joyce | |
| 2008/0052210 | A1 | 2/2008 | Mercier et al. | |
| 2008/0071655 | A1 | 3/2008 | Carlson et al. | |
| 2008/0071661 | A1 | 3/2008 | Jeudy et al. | |
| 2008/0077519 | A1 | 3/2008 | Pedersen et al. | |

OTHER PUBLICATIONS

Welsh, James. "Mutual Funds are Getting a Tad Trickier"; Times-Picayune; Feb. 4, 1996.*
Moen, Barbara. "What methods of EDI do you use?"; Newspaper Financial Executive Journal; May 1994.*
"A Deferred Annuity with Single Premium," <http://www.statefarm.com/insurance/life_annuity/annuity/deferredplus.asp>, retrieved May 14, 2009.

(Continued)

*Primary Examiner* — Edward Chang
(74) *Attorney, Agent, or Firm* — Banner & Witcoff, Ltd.

(57) ABSTRACT

Methods and systems provide a financial account. In one implementation, one or more funding payments for a financial account are received from an investor. The financial account includes a mutual fund. The investor takes withdrawals from the financial account. A balance of the financial account is calculated by a processor. Benefit payments are paid to the investor after the balance of the financial account has reached zero.

12 Claims, 2 Drawing Sheets

(56) References Cited

OTHER PUBLICATIONS

"AXA Equitable Unveils Crossings(SM): My Lifetime IRS(SM)," <http://www/prenewswire.com/cgi-bin/stories.pl?ACCT=ind_focus.story&STORY=/www/story/04-01-2008/0004784319&EDATE=TUE+Apr+01+2008,+12:10+PM>, Apr. 1, 2008.

"Deferred Annuities," <http://www,metiife,com/Applications/Corporate/WPS/CDA/PageGenerator/0,4773,P735,00.html>, retrieved Sep. 8, 2008.

"Destination Income," <http://www.fsa4life.com/Forethought_DIA_Rate_Sheet/Forethought_DIA_Product_Sheet/Product_Sheet_FA7015.pdf>, 2007.

"Guaranteed Retirement Income Solutions for Individuals," <http://www.prudential.com/media/managed/retirementincome/GRIS-individuals.html>, retrieved May 14, 2009.

"Income Edge: Optional Living Benefit Rider," <http://www.ailincome.com/docs/55041.pdf>, Sep. 2007.

"Insurers Look to Help People Beyond Age 100," <http://www.guardianlife.com/company_info/press_releases/october_01_2002.html>, Oct. 1, 2002.

"Lincoln National Variable Annuity Account," <http://www.secinfo.com/dM5Qu.vBq.d.htm>, Sep. 26, 2006.

"Pacific Life Launches a New Way to Guarantee Lifetime Income for Baby Boomers," <http://www.pacificlife.com/NR/exeres/2CD74D73-8078-4FD4-844F-213D329DA3B9.htm>, Jan. 30, 2007.

"The Prudential SmartSolution IRA," http://www.prudential.com/media/rnanaged/ROBR0290906.pdf, Mar. 2009.

* cited by examiner

METHODS AND SYSTEMS FOR PROVIDING GUARANTEED LIFETIME BENEFITS

RELATED APPLICATION

This application is based upon and claims the benefit of priority to U.S. Provisional Application No. 61/064,987, filed on Apr. 7, 2008, the entire contents of which are incorporated herein by reference.

BACKGROUND

1. Technical Field

The present disclosure generally relates to retirement investment products. More particularly, and without limitation, the present disclosure relates to methods and systems for providing guaranteed lifetime benefits and providing a financial product that combines features of mutual funds, annuities, and lifetime benefit guarantee insurance.

2. Background Information

Individuals save for retirement with various goals including obtaining a high rate of return on their investments and obtaining steady streams of income for many years or possibly for life.

Mutual funds, including target-dated mutual funds, provide investors an opportunity to increase the value of invested money or capital. Mutual funds, which are often invested in equities and bonds, provide the potential for a high rate of return on investments but do not protect investors from the risk of loss. Thus, individuals who invest in mutual funds may lose profits as well as their principal investments.

Annuities provide income at predetermined intervals for a fixed period. Annuities can be purchased by a single lump sum payment or through installment payments. Annuities provide a steady stream of income to an investor, but annuities may not provide investment growth sufficient to meet the needs of many investors.

Due to the large initial funding requirement for annuities (whether purchased by a lump sum payment or through installments), investors often have difficulty funding annuities. Many investors thus typically invest in mutual funds throughout their lives while working and then, at retirement, liquidate or rollover their accumulated assets to purchase annuities that will fund their retirement years. Such a plan has several disadvantages. By rolling assets from mutual funds to annuities, retirees can no longer participate in the financial market and are thus precluded from potential gains that the market may provide. Purchasers of annuities at retirement are also subject to the market conditions at the time of purchase. Furthermore, having to liquidate one financial product and purchase another financial product may be burdensome for some investors who do not have the time or expertise to research various annuity products, or cannot afford a financial advisor.

Moreover, many retirees face the possibility of outliving their retirement savings. Such retirees may need to purchase yet another product, e.g., longevity insurance. To address this problem, financial institutions offer a lifetime withdrawal guarantee, which is a form of insurance that provides a retiree with income for the life of the retiree. However, investors have not been able to purchase a financial product that provides the potentially high rate of return on investments of mutual funds, the steady stream of income payments similar to annuities, and a lifetime withdrawal guarantee such that the investors do not have to worry about outliving their investments.

In view of the foregoing, there is a need for improved methods and systems for providing guaranteed lifetime benefits, and in a particular, a financial product that addresses the drawbacks discussed above.

SUMMARY

In one embodiment, a computer-implemented method provides a financial account. The method is performed by a processor executing instructions stored in a computer-readable storage medium. The method comprises receiving one or more funding payments for the financial account from an investor. The financial account includes a mutual fund. The method further comprises enabling the investor to take withdrawals from the financial account. The method further comprises calculating, using a processor, a balance of the financial account. The method further comprises paying benefit payments to the investor after the balance of the financial account has reached zero.

In one embodiment, a system provides a financial account. The system comprises means for receiving one or more funding payments for the financial account from an investor. The financial account includes a mutual fund. The system further comprises means for enabling the investor to take withdrawals from the financial account. The system further comprises a processor for calculating a balance of the financial account. The system further comprises means for paying benefit payments to the investor after the balance of the financial account has reached zero.

In one embodiment, a computer-readable storage medium is provided that includes instructions which, when executed by a processor, perform a method for providing a financial account. The method comprises receiving one or more funding payments for the financial account from an investor. The financial account includes a mutual fund. The method further comprises calculating, using a processor, a balance of the financial account. The method further comprises paying benefit payments to the investor after the balance of the financial account has reached zero.

It is to be understood that both the foregoing general description and the following detailed description are exemplary and explanatory only, and are not restrictive of the embodiments thereof, as claimed. Furthermore, features and variations may be provided in addition to those set forth herein. For example, embodiments may be directed to various combinations and sub-combinations of the features described in the detailed description.

BRIEF DESCRIPTION OF THE DRAWINGS

The accompanying drawings, which are incorporated in and constitute a part of this specification, illustrate various disclosed embodiments. In the drawings.

DETAILED DESCRIPTION

Figure 1:
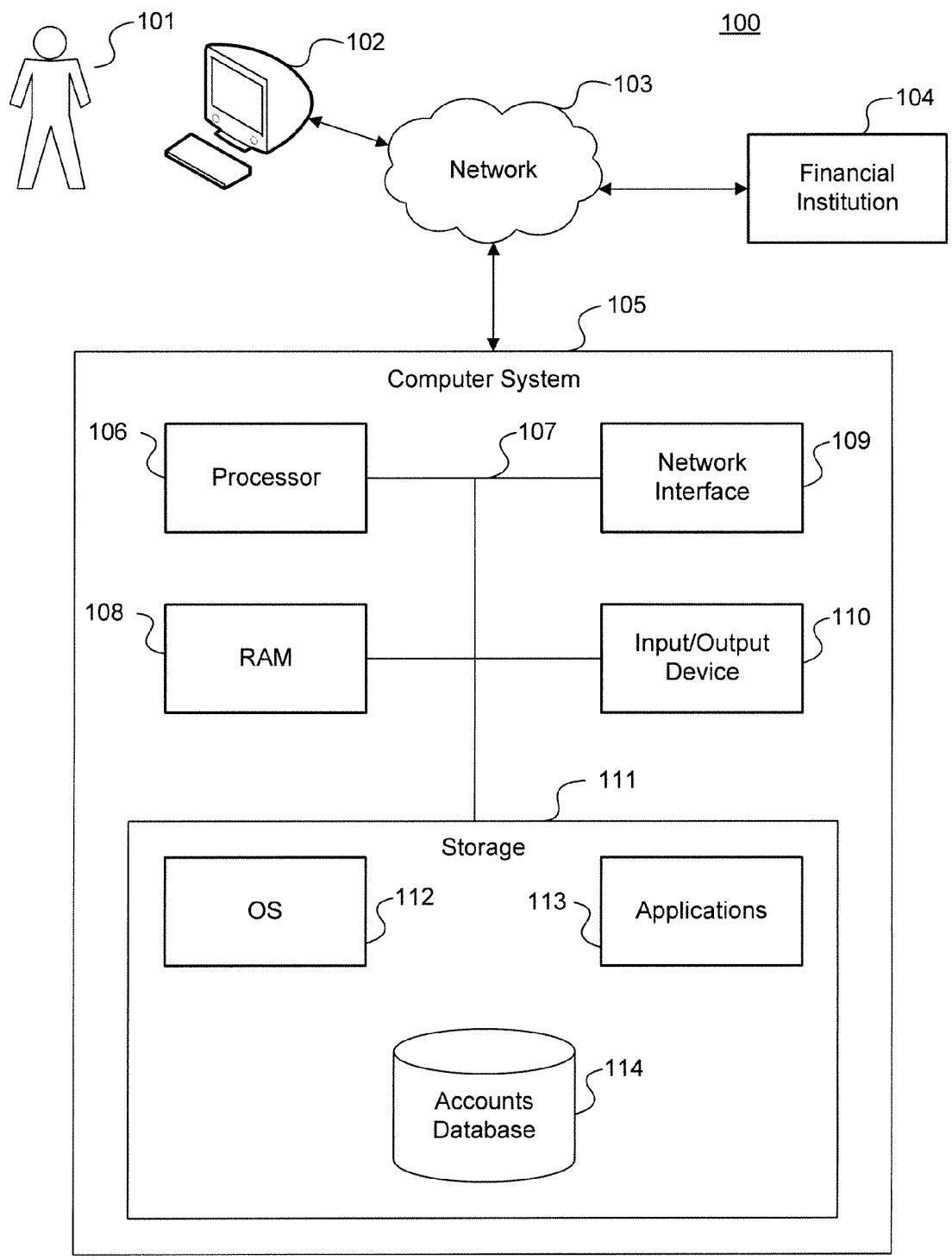
FIG. 1 illustrates an exemplary environment, consistent with a disclosed embodiment.

The following detailed description refers to the accompanying drawings. Wherever possible, the same reference numbers are used in the drawings and the following description to refer to the same or similar parts. While several exemplary embodiments are described herein, modifications, adaptations, and other implementations are possible. For example, substitutions, additions, or modifications may be made to the components illustrated in the drawings, and the exemplary methods described herein may be modified by substituting, reordering, or adding steps to the disclosed methods. Accordingly, the disclosed embodiments are not limited to the following detailed description. Instead, the proper scope is defined by the appended claims.

FIG. 1 illustrates an exemplary environment 100, consistent with a disclosed embodiment. An investor 101 may utilize a personal computer (PC) 102 to purchase a financial product, make or adjust contributions, review statements, read prospectuses, make withdrawals, and perform various activities related to financing. Investor 101 may invest in any one or combination of financial instruments including, for example, stocks, bonds, money market instruments, annuities, mutual funds, certificates of deposit, securities, retirement plans, and similar financial instruments. Investor 101 may include, for example, an investor, a representative of the investor such as a financial advisor, a human resources employee of a company for which the investor works, a financial funds manager, an insurance underwriter, a broker, or an actuary. PC 102 may include, for example, a desktop computer, a laptop, a notebook, a handheld device, a wireless device, a mobile computing device, a personal digital assistant (PDA), or a server computer.

PC 102 may be in communication with a network 103 via a wired or wireless connection. Network 103 may include, for example, a local area network (LAN), a wide area network (WAN), a cellular network, or the Internet, or any wired or wireless network that enables communication. Network 103 may include a financial network for transferring funds. Network 103 may be a combination of multiple networks.

A financial institution 104 may hold assets owned by investor 101, e.g., in an account from which investor 101 can transfer funds to purchase financial products or from which investor 101 may make withdrawals. Financial institution 104 may be in communication with network 103. In addition, financial institution 104 may include, for example, a bank, a brokerage firm, a securities firm, an insurance company, etc. Financial institution 104 may offer financial products.

A computer system 105 may implement exemplary methods for providing a financial product, consistent with disclosed embodiments. Computer system 105 may be owned by financial institution 104, another financial institution offering financial products, or a third party entity. Computer system 105 may be in communication with network 103. Investor 101 and financial institution 104 may communicate with computer system 105 using an application or a web browser.

Computer system 105 may include a processor 106 for executing instructions to perform processes related to providing a financial product, consistent with disclosed embodiments. Processor 106 may be connected to a data bus 107, which connects various components of computer system 105. Computer system 105 may include random access memory (RAM) 108, which may be used by processor 106 as a storage for active data during the execution of instructions. Computer system 105 may include a network interface 109, which allows computer system 105 to connect to network 103. Computer system 105 may include one or more input/output devices 110, for example, a keyboard, a mouse, a monitor, a printer, etc., as well as removable storage devices such as a USB flash drive, a floppy disk, or a CD-ROM.

In one embodiment, computer system 105 may include a web server (not shown) that provides a web interface to network users such as investor 101 or an employee at financial institution 104, enabling communication with computer system 105 using a web browser. Alternatively, a separate web server may be connected to network 103 and communicate with computer system 105 to provide a web interface to network users.

Computer system 105 may include a storage 111 for storing data related to providing a financial product, consistent with disclosed embodiments. Storage 111 may include, for example, a hard drive, a flash drive, a tape storage device, a floppy drive, a CD-ROM, and a DVD-ROM. In one embodiment, storage 111 may reside outside computer system 105, for example, in the form of a network access storage (NAS) or a storage area network (SAN), but in communication with computer system 105. Program instructions for executing the exemplary systems and methods for providing a financial product may be stored in storage 111, received from input/output device 110, or received via network interface 109. These program instructions may be executed by processor 106.

Storage 111 may include an operating system (OS) 112 and applications 113. Storage 111 may include an accounts database 114 which may store, for example, investor information including, for example, names, birth dates, addresses, phone numbers, social security numbers, account numbers, funds owned, amounts and dates of contributions, identities of beneficiaries and annuitants, target retirement dates, guaranteed benefit bases, history of financial activities, and any information related to investors and their respective accounts. Accounts database 114 may further store information related to various funds and financial products. Accounts database 114 may comprise one or more databases. Computer system 105 may update and/or access any information stored in accounts database 114.

Figure 2:
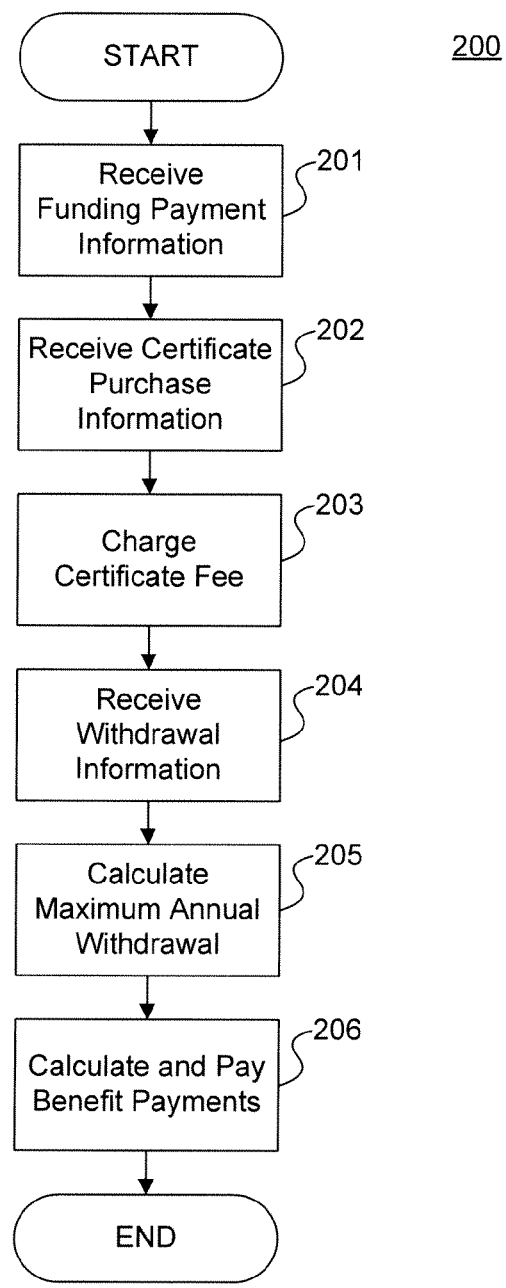
FIG. 2 is a flow chart of an exemplary method for providing a financial product having guaranteed lifetime benefits, consistent with a disclosed embodiment.

FIG. 2 is a flow chart of an exemplary method 200 for providing a financial product, consistent with a disclosed embodiment. The steps of method 200 need not be performed in the particular order described below.

In step 201, computer system 105 receives funding payment information. For example, the funding payment information may be information related to an investment or a contribution made by investor 101 towards an account offered by a financial institution that owns, operates, or has access to computer system 105. The funding payment information may be sent from PC 102 by investor 101 or may be sent from financial institution 104. Computer system 105 may receive the funding payment information from network 103 via network interface 109. Alternatively, the funding payments may be received in non-electronic form (e.g., a paper application including account information or a check sent via mail). The funding payment information may be inputted by a user into computer system 105 via input/output device 110.

In one embodiment, the funding payment information may include, for example, investor information (e.g., name, address, social security number, and age), an investment amount, a date of payment, a name of a fund or an account, and a source of payment (e.g., bank routing number and account number). The funding payment information may be stored in storage 111 and may be used to create or update information stored in accounts database 114.

In one embodiment, a certificate is offered to investors who have purchased shares of a designated, qualifying fund and hold the shares in a brokerage account, referred to as the fund account. The issuer of the certificate (i.e., the financial institution offering the certificate) may designate which funds are eligible for use with the certificate. The issuer may modify (by addition or subtraction) the list of qualifying funds available for purchase with the certificate. The fund may comprise a mutual fund, including a target-dated mutual fund. The certificate provides guaranteed income benefits that guarantee continuing payments over the remaining life of a designated annuitant (and joint annuitants, if applicable) even after the fund account value is reduced to zero due to eligible withdrawals. In one embodiment, investors may be required to purchase a predetermined minimum value or number of shares of the fund in order to purchase the certificate. The annuitant is the person named in the certificate whose measuring life determines when the benefits guaranteed by the certificate are paid. The annuitant may be required to be a living person. The annuitant may be the certificate owner.

In step 202, computer system 105 receives certificate purchase information. For example, the certificate purchase information may be information related to a purchase by investor 101 of a certificate offered by the issuer. In one embodiment, the certificate purchase information may include, for example, investor information (e.g., name, address, social security number, and age), a date of purchase, and a source of payment (e.g., bank routing number and account number). Computer system 105 may receive the certificate purchase information in a manner similar to receiving the funding payment information, described with respect to step 201. The certification purchase information may be stored in storage 111 and may be used to create or update information stored in accounts database 114.

Investor 101 who purchases the certificate may be referred to as the certificate owner. The certificate may have multiple owners, referred to as joint owners. The certificate owner may designate one or more annuitants. The date when the certificate was purchased may be referred to as the issue date. The identities of the certificate owner (or joint owners) and the annuitant (or joint annuitants) and the issue date may be included in the certificate purchase information.

The certificate may be purchased at the same time as the shares of the fund, or the certificate may be purchased after the shares of the fund have been purchased.

In one embodiment, the certificate has two phases: an account phase and a payout phase. The account phase may also be referred to as the funding phase, the saving phase, or the accumulating phase. The payout phase may also be referred to as the disbursement phase. The account phase begins on the issue date and continues until the payout phase begins. During the account phase, investor 101 may purchase additional shares of the fund and make withdrawals from the fund account. The payout phase begins if and when the value of the fund account is reduced to zero due to an eligible withdrawal and a benefit base, described below, is greater than zero. If and when the payout phase begins, guaranteed benefits in the form of benefit payments will begin.

In one embodiment, investor 101 may purchase additional shares of the fund, even after the issue date (i.e., after purchasing the certificate), and the additional shares will be covered by the certificate. Accordingly, computer system 105 may receive additional funding payment information (as described in step 201) after receiving the certificate payment information (as described in step 202).

In step 203, computer system 105 determines and charges a certificate fee. The certificate fee is the price for the guarantee provided by the certificate. The certificate fee may be determined based on, for example, financial research, market research, pricing research, past performance of funds, projected future performance of funds, competitors' financial products, and any information pertinent to the ability of the issuer of the certificate to guarantee future benefits. The certificate fee may be, for example, a fixed amount, a percentage of the fund account value, a percentage of the current or future benefit base, or a percentage of the funding payments. Furthermore, the certificate fee may depend on the type of certificate.

Three different types of certificates are consistent with disclosed embodiments: (1) a basic guaranteed lifetime income certificate, (2) a guaranteed lifetime income certificate, and (3) an enhanced guaranteed lifetime income certificate.

In one embodiment, the certificate fee may be calculated based on an annual certificate fee percentage. For example, the annual certificate fee percentage may be 0.85% for the basic guaranteed lifetime income certificate, 1.00% for the guaranteed lifetime income certificate, and 1.25% for the enhanced guaranteed lifetime income certificate. An annual certificate fee may thus be calculated by multiplying the fund account value and the annual certificate fee percentage. The certificate fee, the annual certificate fee, and the annual certificate fee percentage may be stored in account database 114.

In one embodiment, the certificate fee may be an explicit charge to the fund account. For example, computer system 105 may periodically calculate and deduct the certificate fee through the redemption of shares in the mutual fund. The certificate fee may be changed annually, quarterly, monthly, etc.

In one embodiment, the certificate fee is assessed only during the account phase, and once the certificate has entered the payout phase, the certificate fee will no longer be assessed.

In one embodiment, investor 101 may make withdrawals from the fund account at any time during the account phase and in any amount. Investor 101 may request a withdrawal in writing, via telephone, or electronically, for example, via the web server of computer system 105. For example, investor 101 may make a withdrawal by transferring funds from the fund account to an account at financial institution 104 electronically.

In step 204, computer system 105 receives withdrawal information. Computer system 105 may receive the withdrawal information in a manner similar to receiving the funding payment information, described with respect to step 201. The withdrawal information may include, for example, investor information, an amount of the withdrawal, and account information. Computer system 105 may store the withdrawal information in accounts database 104 or use the withdrawal information to update information already stored in accounts database 104.

In one embodiment, withdrawals may be categorized into eligible withdrawals and ineligible withdrawals. An eligible withdrawal may not affect the amount of the benefit provided under the certificate. In contrast, an ineligible withdrawal may cause the amount of the benefit to decrease. For example, an eligible withdrawal must be taken after an eligible withdrawal start date and the amount of the withdrawal added to all previous withdrawals made during the same certificate year must not exceed a maximum annual withdrawal. The eligible withdrawal start date is the later of a certificate anniversary following the date the annuitant (or youngest joint annuitant) reaches an eligibility age and an eligibility date for the fund whose shares are held in the fund account. For example, the eligibility age may be set to 60. The certificate anniversary is the anniversary of the issue date. The certificate year is the year (365 days or 366 days for leap years) beginning with the issue date or any one certificate anniversary and ending with the next certificate anniversary. The eligibility date is the certificate anniversary in the designated eligibility year for the fund whose shares are held in the fund account. The eligibility year may depend on the target date of the fund.

An example of several target-dated funds and their respective eligibility years are shown in Table 1.

TABLE 1

| Fund | Eligibility Year |
| --- | --- |
| Target Mutual Fund 2005 | 2000 |
| Target Mutual Fund 2010 | 2005 |
| Target Mutual Fund 2015 | 2010 |
| Target Mutual Fund 2020 | 2015 |
| Target Mutual Fund 2025 | 2020 |
| Target Mutual Fund 2030 | 2025 |
| Target Mutual Fund 2035 | 2030 |
| Target Mutual Fund 2040 | 2035 |
| Target Mutual Fund 2045 | 2040 |
| Target Mutual Fund 2050 | 2045 |
| Target Mutual Fund 2055 | 2050 |
| Target Mutual Fund 2060 | 2055 |

For example, if the fund account is invested in Target Mutual Fund 2015 and the certificate was purchased on Jan. 15, 2008, then the eligibility year is 2010 and the eligibility date is Jan. 15, 2010. The eligibility years may be set by the issuer.

Any withdrawal that does not meet the above criteria for an eligible withdrawal may be considered an ineligible withdrawal, and may cause the amount of the benefit available under the certificate to decrease. The issuer may set any additional requirements for eligible withdrawals.

In step 205, computer system 105 calculates a maximum annual withdrawal. The maximum annual withdrawal is the total amount available to be withdrawn from the fund account in a year without reducing the benefits available under the certificate. The maximum annual withdrawal is calculated by multiplying an annual withdrawal percentage and a benefit base. The annual withdrawal percentage is determined based on the age of the annuitant (or the youngest of joint annuitants) when the first eligible withdrawal is taken. For example, Table 2 includes an exemplary listing of possible annual withdrawal percentages.

TABLE 2

| Age of Annuitant | Certificate with Single Annuitant | Certificate with Joint Annuitants |
| --- | --- | --- |
| 60 | 5.0% | 4.5% |
| 61 | 5.1% | 4.6% |
| 62 | 5.2% | 4.7% |
| 63 | 5.3% | 4.8% |
| 64 | 5.4% | 4.9% |
| 65 | 5.5% | 5.0% |
| 66 | 5.6% | 5.1% |
| 67 | 5.7% | 5.2% |
| 68 | 5.8% | 5.3% |
| 69 | 5.9% | 5.4% |
| 70 | 6.0% | 5.5% |
| 71 | 6.1% | 5.6% |
| 72 | 6.2% | 5.7% |
| 73 | 6.3% | 5.8% |
| 74 | 6.4% | 5.9% |
| 75 | 6.5% | 6.0% |
| 76 | 6.6% | 6.1% |
| 77 | 6.7% | 6.2% |
| 78 | 6.8% | 6.3% |
| 79 | 6.9% | 6.4% |
| 80 & older | 7.0% | 6.5% |

The annual withdrawal percentages may be determined based on, for example, financial research, market research, pricing research, longevity of investors, past performance of funds, projected future performance of funds, competitors' financial products, and any information pertinent to the ability of the issuer of the certificate to guarantee future benefits. Generally, the longer investor 101 waits to take the first eligible withdrawal, the higher the initial annual withdrawal percentage will be. In addition, generally, the annual withdrawal percentage will be lower for joint annuitants than for a single annuitant. Computer system 105 may store the maximum annual withdrawal, the annual withdrawal percentage, and the benefit base in accounts database 114.

The benefit base may be calculated differently for the three types of certificates (i.e., (1) the basic guaranteed lifetime income certificate, (2) the guaranteed lifetime income certificate, and (3) the enhanced guaranteed lifetime income certificate).

For the basic guaranteed lifetime income certificate, the benefit base is initially set equal to the fund account value on the issue date. The benefit base is then recalculated on each date additional fund shares are purchased and on each date an ineligible withdrawal from the fund account is made. If additional fund shares are purchased, the amount of the additional purchase is added to the current benefit base. If an ineligible withdrawal is made from the fund account, the benefit base is recalculated by the following formula:

$$\text{New Benefit Base} = \text{Old Benefit Base} \times \frac{\text{New Fund Account Value}}{\text{Old Fund Account Value}},$$

that is, the benefit base is reduced to a new amount equal to the benefit base before the ineligible withdrawal multiplied by the fund account value after the ineligible withdrawal divided by the fund account value before the ineligible withdrawal. For the basic guaranteed lifetime income certificate, the benefit base may not be increased to exceed the fund account value.

An example of benefit base calculations for the basic guaranteed lifetime income certificate is provided. Assume that the certificate is purchased on Jan. 15, 2008, and the fund account value is $100,000. The benefit base on Jan. 15, 2008 is also $100,000. If the fund account value grows to $105,000 and additional fund shares equal to $50,000 are purchased, then the new benefit base would be $150,000, which is the prior benefit base of $100,000 plus the $50,000 of the additional fund shares purchased. If the fund account value grows to $105,000 and an ineligible withdrawal of $25,000 is taken, then the benefit based would be reduced to $76,190.48, which is the prior benefit base of $100,000 multiplied by the fund account value immediately after the withdrawal ($80,000=$105,000-$25,000) divided by the fund account value immediately before the withdrawal ($105,000). If the fund account value falls to $75,000 due to market fluctuations and additional fund shares equal to $50,000 are purchased, then the benefit base will be set to $125,000, not $150,000 (prior benefit base $100,000 plus the $50,000 additional shares purchased) because the fund account value is only $125,000 ($75,000+$50,000) and the benefit base cannot exceed the fund account value.

For the guaranteed lifetime income certificate, the benefit base is initially set equal to the fund account value on the issue date. The benefit base may be increased to the fund account value on each certificate anniversary and reduced on each date an ineligible withdrawal is made from the fund account. On each certificate anniversary, if the fund account value is greater than the benefit base, the benefit base is increased to equal the fund account value; otherwise, the benefit base remains the same. If an ineligible withdrawal is made from the fund account, the benefit base is reduced to a new amount equal to the benefit base before the ineligible withdrawal multiplied by the fund account value after the ineligible withdrawal divided by the fund account value before the ineligible withdrawal.

For the enhanced guaranteed lifetime income certificate, the benefit base is initially set equal to the fund account value on the issue date. The benefit base is then recalculated on each reset date, which includes each certificate anniversary and each date an ineligible withdrawal is made, to equal the greater of a maximum anniversary value or a rollup value.

The maximum anniversary value is initially set equal to the fund account value on the issue date. On each reset date, if the fund account value is greater than the current maximum anniversary value, then the maximum anniversary value is increased to equal the fund account value; otherwise, the maximum anniversary remains the same. If an ineligible withdrawal is made from the fund account, the maximum anniversary value is reduced to a new amount equal to the maximum anniversary value before the ineligible withdrawal multiplied by the fund account value after the ineligible withdrawal divided by the fund account value before the ineligible withdrawal.

The rollup value is initially set equal to the fund account value on the issue date. The rollup value accumulates, for example, daily at a rate that compounds over one year to equal an annual rollup percentage. For example, the annual rollup percentage may be 5%. If additional fund shares are purchased, then the rollup value is increased by the amount of the additional fund share purchase. The rollup value continues to accumulate until the date of the first eligible withdrawal or the end of an annual rollup period, whichever occurs first. For example, the annual rollup period may be 10 years. If an ineligible withdrawal is made from the fund account, the rollup value is reduced to a new amount equal to the rollup value before the ineligible withdrawal multiplied by the fund account value after the ineligible withdrawal divided by the fund account value before the ineligible withdrawal.

In one embodiment, the benefit base is recalculated only during the account phase. If ineligible withdrawals are taken before the eligible withdrawal start date, the benefit base will decrease and thus the maximum annual withdrawal will be lower on the eligible withdrawal start date. Furthermore, even after the eligible withdrawal start date, if the cumulative amount of withdrawals made in a certificate year exceeds the maximum annual withdrawal, then the benefit base and the maximum annual withdrawal will be reduced.

If and when the fund account value is reduced to zero due to an eligible withdrawal and the benefit base is greater than zero, the payout phase begins and guaranteed benefits in the form of benefit payments will begin. A benefit payment start date marks the beginning of the payout phase.

In one embodiment, once the certificate enters the payout phase and the account phase has ended (i.e., after the benefit payment start date), additional fund shares may not be purchased, no more withdrawals may be taken, and the certificate fee will no longer be assessed.

In step 206, upon entering the payout phase, computer system 105 calculates the benefit payments and pays the benefit payments to investor 101. For example, computer system 105 may electronically transfer the amount of the benefit payment to an account owned by investor 101 via direct deposit or mail a check to investor 101. The benefit payments will continue to be paid as long as the annuitant (or joint annuitant) is alive.

Benefit payment may be paid periodically, for example, annually, quarterly, monthly, etc. An annual benefit payment may equal the maximum annual withdrawal. Furthermore, a monthly benefit payment may equal the maximum annual withdrawal divided by 12.

The benefit payments in the first partial year that includes the benefit payment start date may be prorated. For example, if the certificate owner is a living person, each monthly benefit payment in the certificate year which includes the benefit payment start date will equal the maximum annual withdrawal minus the amount of withdrawals taken before the benefit payment start date during the certificate year divided by the number of months left in the certificate year as of the benefit payment start date. A partial month may be counted as one full month. If the certificate owner is a non-living person (e.g., a grantor trust), the amount of each monthly benefit payment will be equal to the maximum annual withdrawal divided by the number of months left in the certificate year as of the benefit payment start date.

As described above, in one embodiment, the amount of the benefit payment may depend on whether the certificate owner is a living or a non-living person.

The certificate may terminate upon any of the following dates: the date the certificate owner elects to cancel the certificate; the date the benefit base is reduced to zero; the date of death of the last annuitant; and the date the certificate owner transfers the entire fund account value to some other investment account other than the qualifying funds.

Although the steps of method 200 have been described above in a particular order, the steps need not be performed in the above order. For example, computer system 105 may calculate the maximum annual withdrawal (as described in step 205) before charging the certificate fee (as described in step 203); and computer system 105 may receive withdrawal information (as described in step 204) before receiving certificate purchase information (as described in step 202). Furthermore, one or more of the steps may be performed continuously or repeatedly through the entire process. For example, computer system 105 may calculate the maximum annual withdrawal (as described in step 205) throughout the entire process including upon any event that might require a recalculation of the maximum annual withdrawal, such as receiving funding payment information (as described in step 201) and receiving withdrawal information (as described in step 204).

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting or deleting blocks. It is intended, therefore, that the specification and examples be considered as exemplary only, with a true scope and spirit being indicated by the following claims and their full scope of equivalents.

What is claimed is:

1. A computer-implemented method for providing a financial account, the method performed by a processor executing instructions stored in a computer-readable storage medium, the method comprising:
    receiving one or more funding payments for the financial account from an investor, the financial account including a mutual fund;
    calculating a benefit base based on a balance of the financial account, the benefit base being distinct from the balance of the financial account;
    enabling the investor to take a number of withdrawals from the financial account;
    calculating, using the processor, the balance of the financial account;
    causing, using the processor, payment of benefit payments to the investor after the balance of the financial account has reached zero and the benefit base is greater than zero;
    deducting a fee from the financial account to fund the benefit payments;
    calculating the fee based on one or more of a predetermined amount, a value of the financial account, and an amount of the one or more funding payments;
    determining that one of the number of withdrawals is ineligible; and
    recalculating the benefit base based on an amounts of the ineligible withdrawal and the balance of the financial account.

2. The method of claim 1, wherein the benefit payments are paid to the investor until the investor dies.

3. The method of claim 1, wherein the mutual fund has a target date.

4. The method of claim 1, wherein the benefit payments are paid periodically at predetermined intervals.

5. A system for providing a financial account, comprising:
    a processor; and
    a memory storing instructions that, when executed by the processor, cause the processor to perform operations comprising:
        receiving one or more funding payments for the financial account from an investor, the financial account including a mutual fund;
        calculating a benefit base based on a balance of the financial account, the benefit base being distinct from the balance of the financial account;
        enabling the investor to take a number of withdrawals from the financial account; calculating the balance of the financial account;
        causing payment of benefit payments to the investor after the balance of the financial account has reached zero and the benefit base is greater than zero;
        deducting a fee from the financial account to fund the benefit payments;
        calculating the fee based on one or more of a predetermined amount, a value of the financial account, and an amount of the one or more funding payments;
        determining that one of the number of withdrawals is ineligible; and
        recalculating the benefit base based on an amount of the ineligible withdrawal and the balance of the financial account.

6. The system of claim 5, wherein the benefit payments are paid to the investor until the investor dies.

7. The system of claim 5, wherein the mutual fund has a target date.

8. The system of claim 5, wherein the benefit payments are paid periodically at predetermined intervals.

9. A non-transitory computer-readable storage medium including instructions which, when executed by a processor, perform a method for providing a financial account, the method comprising:
    receiving one or more funding payments for the financial account from an investor, the financial account including a mutual fund;
    calculating a benefit base based on a balance of the financial account, the benefit base being distinct from the balance of the financial account;
    enabling the investor to take a number of withdrawals from the financial account; calculating, using the processor, the balance of the financial account; and
    causing payment of benefit payments to the investor after the balance of the financial account has reached zero and the benefit base is greater than zero;
    deducting a fee from the financial account to fund the benefit payments;
    calculating the fee based on one or more of a predetermined amount, a value of the financial account, and an amount of the one or more funding payments;
    determining that one of the number of withdrawals is ineligible; and
    recalculating the benefit base based on an amount of the ineligible withdrawal and the balance of the financial account.

10. The medium of claim 9, wherein the benefit payments are paid to the investor until the investor dies.

11. The medium of claim 9, wherein the mutual fund has a target date.

12. The medium of claim 9, wherein the benefit payments are paid periodically at predetermined intervals.

* * * * *